United States Patent [19]

Gierenz et al.

[11] Patent Number: 4,746,696

[45] Date of Patent: May 24, 1988

[54] POLYVINYLPYRROLIDONE SHAPED ADHESIVE CONTAINING AMINOCARBOXYLIC ACID OR CORRESPONDING LACTAM

[75] Inventors: Gerhard Gierenz, Solingen; Gabriella Kraus, Neuss, both of Fed. Rep. of Germany

[73] Assignee: Henkel Kommanditgesellschaft auf Aktien, Duesseldorf, Fed. Rep. of Germany

[21] Appl. No.: 20,002

[22] Filed: Feb. 27, 1987

[30] Foreign Application Priority Data

Feb. 27, 1986 [DE] Fed. Rep. of Germany ....... 3606382

[51] Int. Cl.$^4$ .............................................. C08K 5/34
[52] U.S. Cl. ......................................... 524/98; 524/99; 524/104; 524/238; 526/931
[58] Field of Search .................. 524/98, 238, 99, 104; 526/264, 931

[56] References Cited

U.S. PATENT DOCUMENTS

| | | | |
|---|---|---|---|
| 3,576,776 | 4/1971 | Muszik et al. | 524/238 |
| 3,787,345 | 1/1974 | Dickman et al. | 260/28.5 |
| 3,787,346 | 1/1974 | Dickman et al. | 260/28.5 |
| 3,846,363 | 11/1974 | Ando et al. | 260/29.6 |
| 4,022,311 | 3/1977 | Noomen et al. | 424/65 |
| 4,131,581 | 12/1978 | Coker | 524/98 |
| 4,325,855 | 4/1982 | Dickmann et al. | 524/219 |

*Primary Examiner*—Joseph L. Schofer
*Assistant Examiner*—Angela L. Fugo
*Attorney, Agent, or Firm*—Ernest G. Szoke; Henry E. Millson, Jr.

[57] ABSTRACT

A soft-rubbing shaped adhesive is based on an adhesive forming polymer solution gelled with a soap-forming gelling agent in the presence of a modifying additive comprising an aminocarboxylic acid or corresponding lactam, preferably an aminocarboxylic acid containing from 4 to 8 carbon atoms. Especially useful modifying additives include caprolactam, the sodium salt of aminocaproic acid, or a mixture thereof.

28 Claims, No Drawings

POLYVINYLPYRROLIDONE SHAPED ADHESIVE CONTAINING AMINOCARBOXYLIC ACID OR CORRESPONDING LACTAM

BACKGROUND OF THE INVENTION

1. Field of the Invention

Stick-form rigid adhesives of the type which are often slidably mounted in a reclosable tube for dispensing and which deposit a tacky film when rubbed onto a receiving surface, have become part of everyday life. They are typically obtained (cf. U.S. Pat. No. 3,576,776) from a water-soluble or water-dispersible adhesive-forming synthetic high polymer, particularly polyvinylpyrrolidone (PVP), dissolved or dispersed in an aqueous-organic liquid phase together with a compatible gel-forming component; the gel-forming component generally includes, in particular, alkali metal or ammonium salts of aliphatic carboxylic acids, especially $C_{12}$–$C_{22}$-acids. On heating the highly tacky, aqueous preparations of the adhesive polymers with small quantities of the gel-forming component to relatively high temperatures, usually above 80° C., the mixture solidifies with cooling into a relatively stiff soap gel in which the comparatively rigid micelle structure of the gel is apparent to a predominant degree. The gelled composition can then be shaped, e.g., formed and handled in stick form, and, if desired, disposed in an applicator, such as a reclosable tube dispenser. When rubbed onto a receiving surface, the micelle structure of the gelled adhesive is destroyed and the solidified composition is converted into an adhesive paste.

2. Discussion of Related Art

Numerous attempts have been made to improve adhesive sticks of this type by modifying the gel-forming component and/or by modifying the solvent-activated adhesive-forming component. For example, U.S. Pat. No. 3,846,363 discloses the use of the reaction product of sorbitol and benzaldehyde as the gel-forming component, while U.S. Pat. No. 4,325,855 describes salts of substituted terephthalic acid amides as gelling agents. According to U.S. Pat. Nos. 3,787,345 and 3,787,346, free long-chain aliphatic acids or esters thereof, rather than alkali metal salts of aliphatic carboxylic acids, are employed as the gel-forming component, and anionic, non-soapy wetting agents are incorporated into the stick to improve rubbing and depositing characteristics. Additionally, U.S. Pat. No. 4,011,311 teaches the use of a reaction product of an aromatic diisocyanate with a mono- and/or dialkanolamine as gel-forming agent.

Despite all these proposals, the oldest form of adhesive sticks, i.e., those based on soap gels such as described in U.S. Pat. 3,576,776, to Muszik, et al., issued Apr. 27, 1971 and incorporated herein by reference, remain by far the most widely used. In a particularly popular embodiment of this technology, a solution of PVP in an aqueous organic solvent mixture is converted into a soft-rubbing adhesive stick by incorporation of alkali soaps of aliphatic carboxylic acids as the gelling agent, followed by gelling of the mixture. These adhesive sticks are, however, susceptible of improvement in several respects. For example, the application of the adhesive to the substrate material from these sticks is often not as easy as is desirable, with the result that rubbing of the adhesive stick onto fragile substrates such as thin paper cannot be readily accomplished. Further, the adhesive layer formed frequently has an inconveniently short open time as compared to similar commercial products, losing tackiness rapidly and hampering careful alignment of the surfaces to be bonded.

DESCRIPTION OF THE INVENTION

The invention is based on the surprising discovery that soap gel based adhesive sticks having improved adhesive and dispensing characteristics are obtained by incorporating therein an aminocarboxylic acid or corresponding lactam as modifying additive. In particular, adhesive sticks according to the invention are characterized by contact tackiness over a relatively long period, and particularly soft and smooth rubbing characteristics for application of adhesive to substrate, without adverse affect upon the mechanical stability of the adhesive stick material, or the performance of the adhesive.

While the adhesive composition of the invention is referred to throughout the specification as a "stick" characterizing the rigid shaped structure of a preferred embodiment, the invention is equally applicable to shaped adhesive compositions of varying firmness, which is usually controlled in the gelling step, as known in the prior art.

DETAILED DESCRIPTION OF THE INVENTION

Other than in the operating examples, or where otherwise indicated, all numbers expressing quantities of ingredients or reaction conditions used herein are to be understood as modified in all instances by the term "about".

Accordingly, the present invention comprises a soft-rubbing adhesive stick composition based on a soap-gelled aqueous organic medium containing a filmforming, water-soluble or water-dispersible synthetic adhesive-forming polymer, wherein the adhesive composition further contains a minor quantity of a lower aminocarboxylic acid, a corresponding lactam, or a mixture thereof.

Suitable aminocarboxylic acids contain up to 12 carbon atoms, usually at least 3 carbon atoms, and more especially, from 4 to 8 carbon atoms. An outstanding representative of this class of compounds with respect to practical application characteristics of the adhesive stick is ε-caprolactam or the ε-aminocaproic acid derived therefrom. The quantity in which the aminocarboxylic acids, corresponding lactams, or mixtures thereof are used in accordance with the invention is usually no more than 15% by weight, and preferably from 2.5 to 15% by weight, based on the adhesive composition as a whole. In a preferred embodiment, the lactams or aminocarboxylic acids are used in a total quantity of from 3 to 10% by weight. In the case of caprolactam and aminocaproic acid, a quantity of from 4 to 9% by weight, again based on the total weight of the adhesive composition, is particularly preferred.

The soap gel sticks of the invention have a mildly alkaline pH-value ranging from 7 to 11.5. Where ring-opened aminocarboxylic acids are employed as modifying additives according to the invention, these acids are usually at least partly present as corresponding alkali metal salts, especially sodium salts. It has been found that the lactam and/or the corresponding ring-opened aminocarboxylic acid additives function as buffers to some extent, shifting the pH-value of the adhesive into a somewhat more mildly alkaline region. Shaped adhesive compositions of the type according to the invention therefore generally have a pH value in the range of from 9.5 to 11.5, and more especially in the range of from 10.0 to 11.0.

In one particularly preferred embodiment of the invention, a mixture of a lactam and the corresponding ring-opened aminocarboxylic acid is used as modifying additive in the shaped adhesive composition. The weight ratio of these two components is preferably in the range of from 20 to 90 parts by weight lactam to 80 to 10 parts by weight of the ring-opened acid, and more especially in the range of from about 45 to 75 parts by weight lactam to 55 to 25 parts by weight of the ring-opened acid. In the production of improved adhesive sticks according to this embodiment, the desired distribution ratio of lactam to ring-opened aminocarboxylic acid may be affected by the alkali available during in situ soap formation, as the lactam may be partially hydrolyzed to the corresponding ring-opened aminocarboxylic acid via the aqueous organic liquid phase containing alkali metal hydroxide, particularly sodium hydroxide. Thus, starting ratios of lactam and aminocarboxylic acid should be adjusted as necessary to maintain the desired ratio in the face of possible hydrolysis.

The adhesive-forming component of the soap gel compositions of the invention corresponds to the components known to the prior art as adhesives for adhesive sticks and liquid adhesives, especially those set forth in U.S. Pat. No. 3,576,776. The preferred water-soluble adhesive is polyvinylpyrrolidone having a K-value of from 70 to 90. Other suitable high molecular weight synthetic polymers which are converted into an active adhesive component via the solvent phase (solvent-activated adhesives) are known from the literature and include, for example, polyvinylalcohol, polyacrylic and/or methacrylic acids, polyacrylamides and copolymers thereof, polyvinylmethyl ethers, styrene-butadiene copolymers, and butadieneacrylonitrile copolymers. Adhesive polymer is employed in amounts of from 5 to 40% by weight of the adhesive composition, and usually in amounts of from 20 to 35% by weight. In a preferred embodiment of the invention, PVP is incorporated into the composition as solvent-activated adhesive in amounts which are toward the lower end of this range. In this embodiment, the stick composition contains no more than 28% by weight, and preferably no more than 25% by weight, PVP.

The aqueous organic liquid medium, in addition to water, contains substantially non-volatile or low-volatility organic water-miscible and/or water-soluble solvents for the adhesive polymer, with the solvents selected to fulfill solubility or dispersibility requirements for the polymer and to provide adequate drying characteristics to the adhesive composition as well understood in the art. It is favorable to use polyether glycols, especially polyethylene glycols, as organic solvent; preferred polyether glycols are polyethylene glycols having an average molecular weight of from 400 to 1000, and more especially in the range of from 500 to 800. Other suitable water-miscible solvents include polyhydric alcohols, such as glycerol sorbitol, and trimethylol propane. Mixtures of glycerol and polyethylene glycol having an average molecular weight of from 400 to 1000 have proved to be especially effective.

The aqueous organic liquid medium contains at least 50% water by weight and correspondingly smaller quantities of organic water-miscible and water-soluble solvent. To 100 parts by weight of water there is typically present 10 to 50 parts by weight of the substantially non-volatile or low-volatile solvent. The aqueous organic medium, especially when a mixture of gylcerol and polyethylene glycol is employed, generally contains from 6 to 20% by weight of the adhesive composition.

Salts of natural and/or synthetic fatty acids containing from 8 to 36 carbon atoms are used in known manner as the gel-forming component; preferably, sodium salts are employed, although other soap-forming cations including other alkali metals (e.g.K), ammonium, and substituted ammonium such as $C_1$-$C_4$-alkyl ammonium, are useful as known in the art. Fatty acids containing from 10 to 22, and more especially from 12 to 18, carbon atoms are particularly suitable. The gel-forming sodium soaps are used in known quantities of from 3 to 10% by weight, and preferably of from 5 to 8% by weight based on the total weight of the adhesive composition, depending on the degree of gelling required, but not in sufficient amounts to interfere with the adhesive or mechanical characteristics of the products. As is known in the art, the salts may also be prepared in situ by combining the fatty acid and a suitable base, usually sodium hydroxide, in the medium to form the gelling agent. In addition to the main components mentioned supra, it is possible to also incorporate standard adhesive auxiliaries, such as materials which further promote easy and soft rubbing and desposition of the adhesive film, for example sorbitol; or pigments, dyes, odor enhancers, and other customary additives. These auxiliaries are present in small amounts, as used in the prior.

To prepare the adhesive stick compositions according to the invention, the adhesive polymer is dispersed or dissolved in the aqueous organic medium together with the gelling agent and modifying aminocarboxylic additive to form a homogeneous mixture. After heating to above 80° C., and preferably above 85° C., in known manner, the resulting melt is then moulded, typically by casting into stick form, preferably directly into a reclosable tube or other dispenser. An important advantage of the soap gel stick formulated in accordance with the invention is that the viscosity of this melt in the present formulation is considerably lower at the casting temperature, usually from 60° C. to 65° C., than in other known soap gel sticks. At 60° C., for example, typical melts according to the present invention have a viscosity of only about 15 Pa.s, while known soap gel prior art melts are characterized by viscosities of from 90 to 100 Pa.s. This improved viscosity makes the molten stick composition much easier to mold, especially to pack into reclosable tubes, without formation of bubbles. Accordingly, the invention not only provides an improved shaped adhesive, it also considerably simplifies production of the shaped adhesive.

It is particularly surprising that the modifying additives according to the invention not only considerably extend the open time of the adhesive, but also do not adversely affect dimensional stability of the stick. In addition, it is possible to economize by reducing the amount of adhesive component employed, without sacrifice of bond strength.

EXAMPLES

Example 1

8.7 g myristic acid were introduced into an aqueous organic medium comprising 71 g water, 7.5 g glycerol, 6.0 g polyethylene glycol (molecular weight 600), and 15.0 g of a 70% sorbitol solution in a heatable, 250 ml capacity round-bottomed flask equipped with a stirrer and reflux condenser. 3.3 g 50% sodium hydroxide were then added with stirring, followed by heating of the mixture to 75° C. After a clear solution had formed, 31.5 g polyvinylpyrrolidone (K-value 80) mixed with 6.6 g caprolactam were scattered in while stirring and the temperature increased to 95° C. After the polyvinylpyrrolidone had completely dissolved (about 2 hours), the mass was cast at a temperature of about 60° C. into standard reclosable tubes for adhesive sticks 16 mm in diameter and allowed to cool.

Example 2

Adhesive sticks were made in the same way as described above, except that 10 g caprolactam were introduced together with the polyvinylpyrrolidone and only 67 g water were used.

In both cases, dimensionally stable sticks were obtained after cooling to room temperature.

Testing of Samples

Testing was carried out at room temperature (23.5° C.) in 35 to 37% relative air humidity.

Bonding was tested on chrome paper (100 g/m$^2$) coated on one side which had previously been stored for at least 2 days under the above-mentioned conditions. To this end, 5 cm wide, 30 cm long strips were cut and adhesive from the adhesive stick was applied to the uncoated side of the paper. The stick was drawn over the paper 10 times under normal hand pressure. All tests were carried out by three people independently of one another.

Before the adhesive-coated side of the test strips was pressed onto a substrate of the same chrome paper (uncoated side), the adhesive-coated paper was left exposed for 30 or 60 or 90 seconds under the above-described conditions. Bonding was then carried out under hand pressure (gentle rubbing) in such a way that the uncoated paper sides came into adhesive contact.

After standing for 10 minutes, the test strips were peeled off the substrate by hand at an angle of approximately 140°. The following result was obtained: For an airing time of 30 or 60 seconds, complete surface-to-surface bonding was obtained in every case, as reflected in the tearing of the paper. For an airing time of 90 seconds for the composition of Example 2, complete bonding was also obtained. For the 90 second airing time for the composition of Example 1, bonding was not satisfactory throughout.

Comparison Test

An adhesive stick was prepared in the same way as in Example 1, except that no caprolactam was added. Adhesive sticks of this composition were tested in the same way as described. In none of the Examples could bonding be obtained after airing of the adhesive for even 30 seconds.

We claim:

1. In a shaped adhesive composition comprising a soap gel of polyvinylpyrrolidone in an aqueous organic medium with a soap-forming gelling agent, the improvement comprising the additional presence of a modifying additive which is a $C_2$-$C_{12}$-aminocarboxylic acid, a corresponding lactam, or a mixture thereof.

2. The adhesive composition of claim 1, wherein the aminocarboxylic acid contains from 4 to 8 carbon atoms.

3. The adhesive composition of claim 1, wherein the aminocarboxylic acid or corresponding lactam is ε-aminocaproic acid or ε-caprolactam.

4. The adhesive composition of claim 1, wherein the aminocarboxylic acid or corresponding lactam is present in an amount of from about 2.5 to 15% by weight, based on the total weight of the composition.

5. The adhesive composition of claim 4, wherein the aminocarboxylic acid or corresponding lactam is present in an amount of from about 3 to 10% by weight.

6. The adhesive composition of claim 1, wherein a mixture of an aminocarboxylic acid and its corresponding lactam in a ratio of from about 20-90 parts by weight lactam to 80-10 parts by weight of the aminocarboxylic acid is additionally present as the modifying additive.

7. The adhesive composition of claim 1, wherein the modifying additive is a mixture of an aminocarboxylic acid and lactam which are present in a ratio of from about 45-75 parts by weight lactam to 55-25 parts by weight aminocarboxylic acid.

8. The adhesive composition of claim 1, wherein the pH of the composition is alkaline.

9. The adhesive composition of claim 1, wherein the pH of the composition is from about 9.5 to 11.5.

10. The adhesive composition of claim 1, wherein the gelling agent is an alkali metal or ammonium soap of a $C_{12}$-$C_{18}$-fatty acid.

11. The adhesive composition of claim 10, wherein the alkali metal is sodium.

12. The adhesive composition of claim 1, wherein the gelling agent is a $C_{10}$-$C_{22}$-aliphatic carboxylic acid in combination with an alkali metal, unsubstituted ammonium, or alkyl-substituted ammonium cation.

13. The adhesive composition of claim 1, wherein the polyvinylpyrrolidone is present in an amount of no more than about 28% by weight of the total composition.

14. The adhesive composition of claim 13, wherein the polyvinylpyrrolidone is present in an amount of no more than about 25% by weight.

15. The adhesive composition of claim 13, wherein the polyvinylpyrrolidone has a K-value of about 70 to 90.

16. The adhesive composition of claim 1, wherein the aqueous organic medium comprises a mixture of water with a low-volatile or substantially non-volatile organic solvent in an amount of at least about 50% water by weight, based on the total weight of the water/organic solvent mixture.

17. The adhesive composition of claim 16, wherein the water/organic solvent mixture comprises from about 10 to 50 parts by weight solvent to 100 parts by weight water.

18. The adhesive composition of claim 16, wherein the organic solvent is a mixture of polyglycol ether and glycerol.

19. The adhesive composition of claim 18, wherein the polyglycol ether is polyethylene glycol having an average molecular weight of from about 400 to 1000.

20. The adhesive composition of claim 1, wherein the shaped adhesive is a substantially rigid stick.

21. A method for producing a shaped adhesive comprising gelling polyvinylpyrrolidone in the presence of a modifying additive comprising a $C_2$-$C_{12}$-aminocarboxylic acid, a corresponding lactam, or mixture thereof in an aqueous organic medium with a soap-forming gelling agent, and molding the gelled adhesive to a shaped form.

22. The method of claim 21, wherein the adhesive gel is cast into the mold at a temperature of from about 60° C. to 65° C.

23. The method of claim 21, wherein the aminocarboxylic acid contains from 4 to 8 carbon atom.

24. The method of claim 21, wherein the aminocarboxylic acid or corresponding lactam is ε-aminocaproic acid or ε-caprolactam.

25. The method of claim 21, wherein the aminocarboxylic acid or corresponding lactam is present in an amount of from about 2.5 to 15% by weight, based on the total weight of the composition.

26. The method of claim 21, wherein the aminocarboxylic acid or corresponding lactam is present in an amount of from about 3 to 10% by weight.

27. The method of claim 21, wherein the modifying additive is a mixture of an aminocarboxylic acid and its corresponding lactam in a ratio of from about 20–90 parts by weight lactam to about 80–10 parts by weight of the aminocarboxylic acid.

28. The method of claim 27, wherein the modifying additive is a mixture of an aminocarboxylic acid and lactam in a ratio of from about 45–75 parts by weight lactam to 55–25 parts by weight aminocarboxylic acid.

* * * * *